US012596558B1

(12) United States Patent     (10) Patent No.:     US 12,596,558 B1
Shaikh et al.                     (45) Date of Patent:         Apr. 7, 2026

(54) NO-CODE UI CREATION FOR A MULTI-TENANT CLOUD-BASED APPLICATION THAT SUPPORTS AN EXTENSIBLE DATA SCHEMA MODEL

(71) Applicant: Apttus Corporation, Broomfield, CO (US)

(72) Inventors: Farhad Ahmed Shaikh, Fremont, CA (US); Haseebulla M. Khan, San Ramon, CA (US)

(73) Assignee: Conga Corporation, Houston, TX (US)

( * ) Notice: Subject to any disclaimer, the term of this patent is extended or adjusted under 35 U.S.C. 154(b) by 242 days.

(21) Appl. No.: 18/392,280

(22) Filed: Dec. 21, 2023

(51) Int. Cl.
 *G06F 9/451* (2018.01)
 *G06F 8/34* (2018.01)
 *G06F 8/38* (2018.01)

(52) U.S. Cl.
 CPC ................ *G06F 9/451* (2018.02); *G06F 8/34* (2013.01); *G06F 8/38* (2013.01)

(58) Field of Classification Search
 CPC ............... G06F 9/451; G06F 8/34; G06F 8/38
 See application file for complete search history.

(56) References Cited

U.S. PATENT DOCUMENTS

| | | | | |
|---|---|---|---|---|
| 2013/0055201 A1* | 2/2013 | No | ........................... | G06F 16/00 |
| | | | | 717/113 |
| 2017/0235559 A1* | 8/2017 | Saenz | ................. | G06F 11/3672 |
| | | | | 717/171 |
| 2023/0280983 A1* | 9/2023 | Zang | ....................... | G06F 40/56 |
| | | | | 717/109 |

* cited by examiner

*Primary Examiner* — Mahelet Shiberou
(74) *Attorney, Agent, or Firm* — Lessani Law Group, PC

(57)          ABSTRACT
The present disclosure relates to a system that enables no-code creation of tenant-specific user interfaces for a multi-tenant, cloud-based application. Users of the application are able to customize their own data model for the application. The system includes a UI component registry that includes all code and metadata required to render a UI component. Using the metadata from a tenant's custom data model and metadata from the UI component registry, the system provides a no-code development workspace in which a tenant can create custom UI pages, add UI components to the pages, and associated specific data fields from the tenant's data model with these components, all without writing any code. A page layout definition is used to render the custom UI pages, where code for the UI components is retrieved from the component registry and substantially real-time data binding is performed between the UI components and the selected data fields.

20 Claims, 4 Drawing Sheets

CREATING CUSTOM UI PAGES WITH A NO-CODE UI BUILDER

*EXAMPLE SYSTEM ARCHITECTURE*

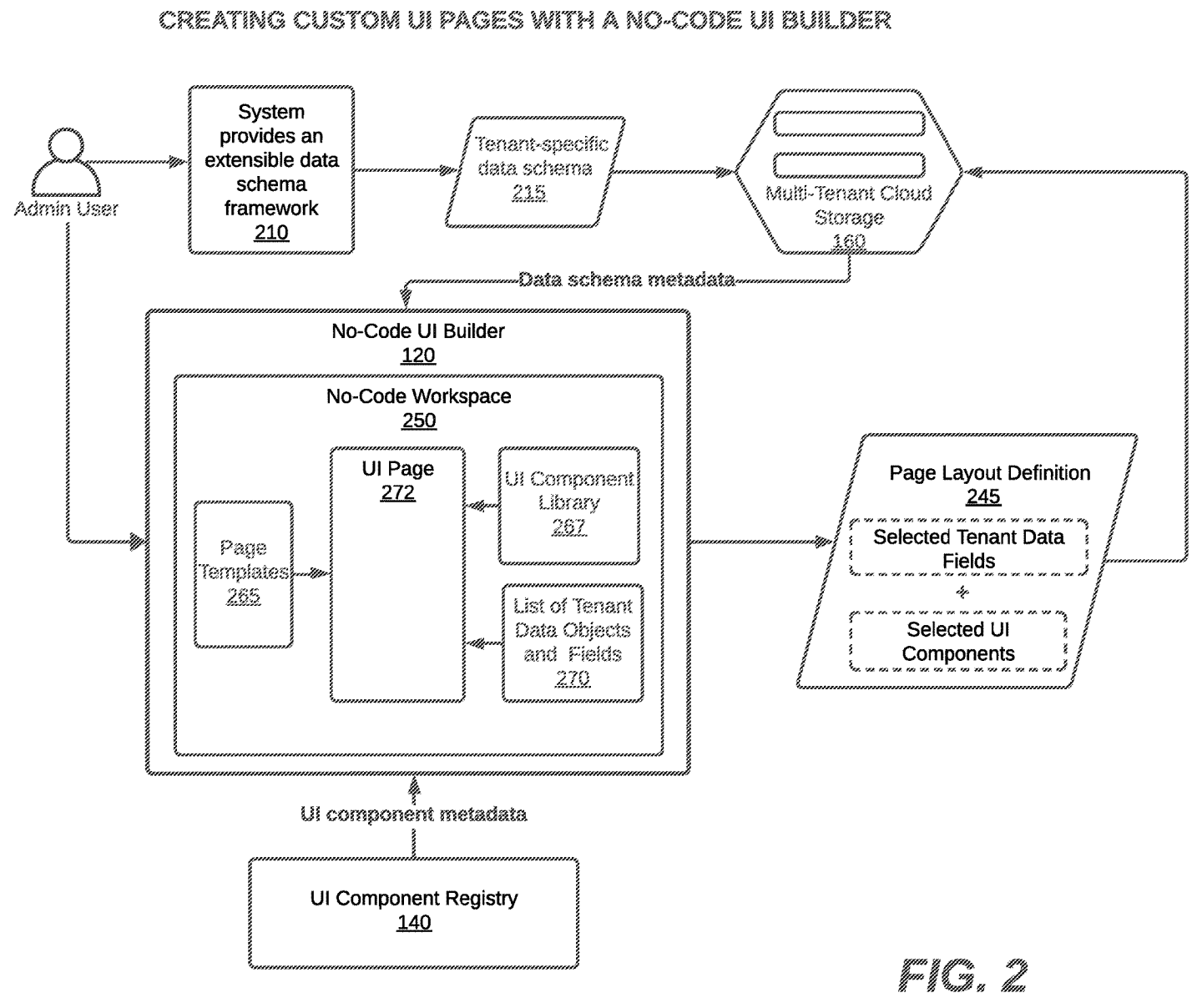

CREATING CUSTOM UI PAGES WITH A NO-CODE UI BUILDER

Admin User

System provides an extensible data schema framework 210

Tenant-specific data schema 215

Multi-Tenant Cloud Storage 160

Data schema metadata

No-Code UI Builder 120

No-Code Workspace 250

UI Component Library 262

List of Tenant Data Objects and Fields 270

Page Templates 265

UI Page 272

UI Component Registry 140

UI component metadata

Page Layout Definition 245

Selected Tenant Data Fields

+

Selected UI Components

FIG. 2

RENDERING CUSTOM UI PAGES

Extensible Page
385

Section A

UI Component

UI Component

Section B

UI Component

Tenant Client
390

Layout Renderer
150

Section Renderer
365

Component Injector
375

UI Component Registry
140

Page Layout Definition
245

Tenant Data Fields
+
UI Components

Data from selected data fields
355

Multi-Tenant Cloud Storage
160

UI Component Registry
140

UI Component
450

Component Logic
410

Model
420

Manifest
430

NO-CODE UI CREATION FOR A MULTI-TENANT CLOUD-BASED APPLICATION THAT SUPPORTS AN EXTENSIBLE DATA SCHEMA MODEL

BACKGROUND OF THE INVENTION

1. Field of the Invention

This invention relates generally to user interface creation for a multi-tenant cloud-based application and, more specifically, to enabling no-code creation of custom UIs for a multi-tenant cloud-based application that supports an extensible data schema model.

2. Description of the Background Art

The use of multi-tenant, cloud-based applications by businesses is becoming increasingly prevalent. Multi-tenant, cloud-based applications are usually sold as a service (i.e., SaaS applications) and execute within a cloud-based, multi-tenant computing environment, such as AMAZON AWS or Microsoft AZURE, that includes a multi-tenant datastore for customer data. The applications typically have a default data schema model that is available to all customers of the application. Some multi-tenant, cloud-based applications support extensible data schema model that enable each business to customize the application's data schema model to best suit their business needs. In such cases, the business also requires custom web user interfaces (UIs) to the application in order to display and make use of their customized data schema model within the application.

Building web user interface (UI) applications remains one of the most complex tasks in software product development. The effort it takes to build business-ready applications is often prohibitive for many businesses, forcing many companies to settle with less-than-ideal rigid solutions. There are many frameworks and commercial products available in the market that aid in building application UI. Most of these frameworks and tools require some form of coding to be done and are targeted exclusively for developers. A comprehensive no-code tool that enables a customer to add new UI pages or modify existing UI pages with minimal effort for a multi-tenant, cloud-based application is non-existent. Existing solutions do not adequately support customization for multi-tenant, cloud-based applications. Some tools provide ability to integrate UI components like forms, grid, and charts into a UI page, but they fail to support extensible data models. For example, an existing tool may enable a user to add a grid to a UI page, but not enable a user to display a customer-specific data field within the grid. Some tools are tied to specific technology and are difficult to integrate with different application flows. Most existing solutions solve one problem or the other in a piece meal approach instead of addressing all the problems in a consolidated way. Therefore, there is a strong demand for a comprehensive solution that enables customers to build web UI applications in a multi-tenant, cloud-based platform using a no-code approach that supports extensible data schema models.

SUMMARY OF THE DISCLOSURE

The present disclosure relates to a system, method, and computer program for the no-code creation of tenant-specific user interfaces for applications operating in a cloud-based, multi-tenant environment with support for extensible data schema models. The result is that the customers with no coding experience can easily build or extend the UI application to address their business needs, including add and using custom data fields in their UI.

The system employs a meta-data driven approach to provide a no-code user interface creation process. The system enables tenants of a multi-tenant cloud-based application to define custom data fields within their data schema model, which can be used to create and render UIs tailored to their specific needs. For each tenant, the system stores metadata describing each tenant's custom data schema model. The system includes a UI component registry that includes all code and metadata required to render a UI component. Using the metadata from a tenant's custom data schema model and metadata from the UI component registry, the system provides a no-code development workspace in which a tenant can create custom UI pages, add UI components to the pages, and select and associated specific data fields from the tenant's data schema model with these components, all without writing any code.

When a user saves a custom UI page, the system stores a page layout definition for the page. The page layout definition describes the page layout configuration, the UI components on the page, and the data objects and associated data fields associated with each UI component.

The system uses page layout definitions to render the custom UI pages, retrieving code for the UI components from the component registry and performing substantially real-time data binding between the UI components and the selected data fields. All the necessary data is retrieved from the multi-tenant datastore or associated cache.

In one embodiment, a method for enabling no-code creation of a tenant specific UI for an application executing in a cloud-based, multi-tenant environment comprises the following steps:

enabling an extensible data schema framework in which tenants are able to create tenant-specific fields for data objects used by an application in a cloud-based, multi-tenant environment;

receiving data schema model inputs from a tenant and updating the tenant's data schema model in a multi-tenant datastore in the cloud-based environment;

maintaining a UI component registry, wherein the UI component registry stores all code and metadata required to render each UI component in the registry; and providing a no-code UI development workspace for constructing tenant-specific UIs for the application, enabling a tenant user to:

create custom pages for the application;

add UI components to the custom pages from the UI component registry without coding;

select and associate, without coding, specific data fields with the added UI components using metadata obtained from the tenant's data schema model in the multi-tenant datastore;

for each custom page created by the tenant, saving a page layout definition describing the page layout configuration, the UI component(s) on the page, and the data object and associated data fields associated with each UI component;

rendering a tenant-specific UI interface for the application comprising one or more custom pages, wherein each custom page is rendered in substantially real time accordance with the page layout definition for the page and rendering the page includes:

retrieving code and metadata for each UI component referenced in the page layout definition, wherein the code and metadata is retrieved from the UI component registry;

performing substantial real-time data binding between the UI components in the page layout definition and the corresponding data fields selected by the tenant, wherein the bound data is retrieved from the tenant's data in the multi-tenant datastore; and injecting the components and bound data into the rendered page.

BRIEF DESCRIPTION OF THE DRAWINGS

FIG. 2 is a flow diagram that illustrates a method, according to one embodiment, for enabling a tenant user to create custom UI pages for a cloud-based, multi-tenant application without coding.

DETAILED DESCRIPTION OF THE PREFERRED EMBODIMENTS

The present disclosure relates to a system, method, and computer program for the no-code creation of tenant-specific user interfaces for a multi-tenant, cloud-based application that supports extensible data schema model customizable by each tenant. The result is that the customers with no coding experience can easily build or extend the application to address their business needs, including add and using custom data fields in their UI. The system employs a meta-data driven approach to provide a no-code user interface creation process.

1. Definitions

As used herein, a "data object" is an entity in a datastore for storing data, wherein the data object includes data fields. A data object is defined by a data object schema definition, which is object metadata that typically includes the name of the data object, the fields of the data object, and the data types accepted by each field. "Data records" or "customer records" are instances of a data object. For example, in a Quote-to-Cash application that enables a user to generate quotes, there may be a "quote" object. The specific quotes created and saved by the customer are instances of the "quote" object. The instances of the quote object, namely the quotes created by the customer, all adhere to the data schema definition for the quote object. This means that all the quotes will have the fields specified in the schema definition and the data in each field will be of the data type specified for the field in the data schema definition.

A "tenant user" is a user at a tenant of a multi-tenant, cloud-based application. For example, the tenant user may be an administrator that is charged with creating a tenant's custom UI for the multi-tenant, cloud-based application.

A "UI component" is an element of a UI page in which data may be displayed. A data grid or master-detail widget are few examples of a UI component.

2. Example System Architecture

Figure 1:
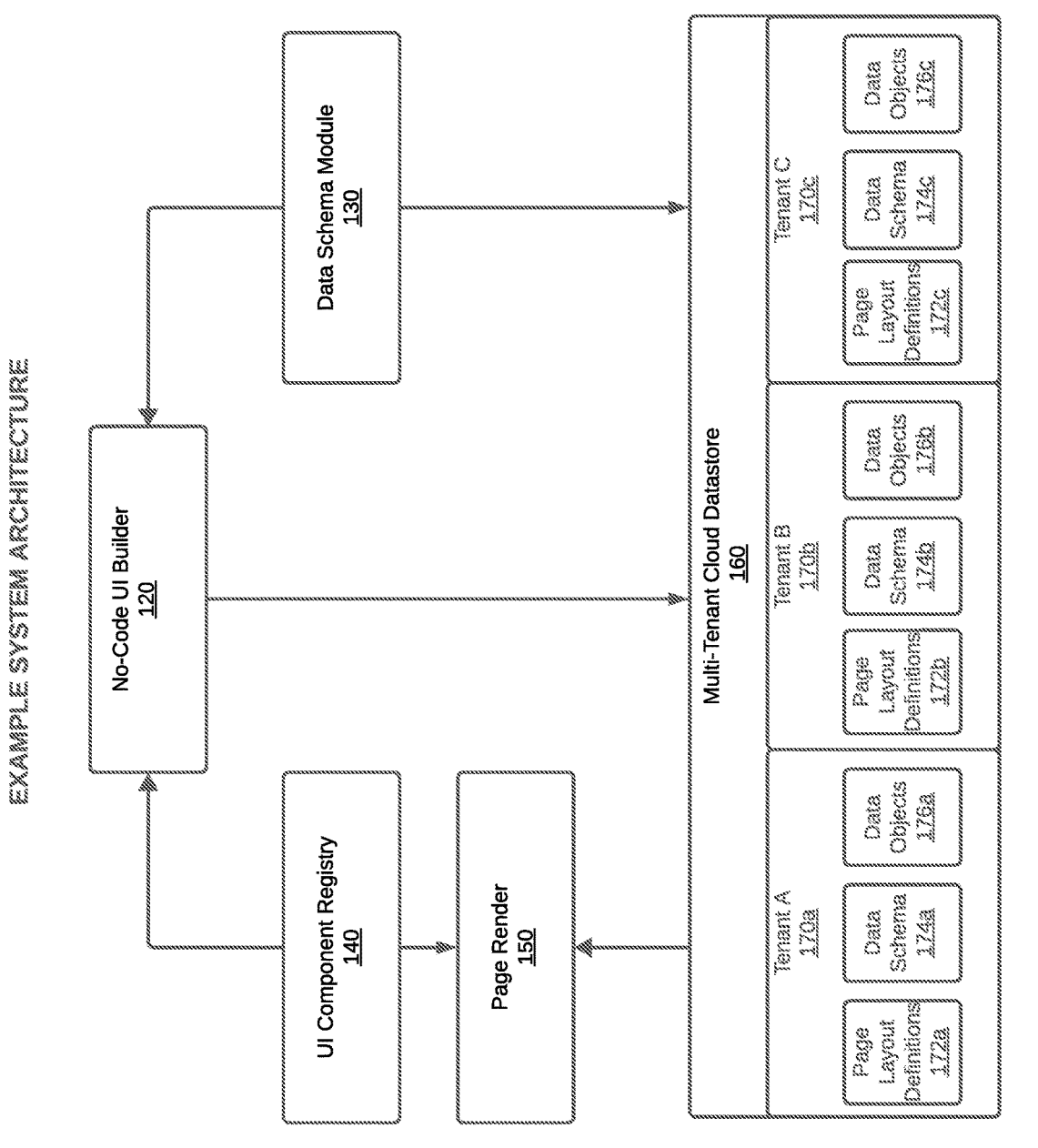
FIG. 1 is a block diagram that illustrates an example architecture for a system that enables no-code creation of tenant-specific user interfaces for applications operating in a cloud-based, multi-tenant environment.

FIG. 1 illustrates an example architecture for a system that enables no-code creation of tenant-specific user interfaces for a multi-tenant, cloud-based application. The system includes a Data Schema Module (130), a UI Component Registry (140), a No-Code UI Builder Module (120), and a Page Renderer Module (150). Data for the application is stored in a Multi-Tenant Cloud Datastore (160).

The Data Schema Module (130) enables tenants to define a custom data schema model. This module allows for the extension of the default data schema model used by the application, enabling tenants to create fields and objects that are unique to their application's requirements. For example, a tenant can add tenant-specific fields to an existing data object. The Data Schema Module ensures that the data model of the tenant's application is flexible and can evolve to meet changing business needs.

The UI Component Registry (140) is a technology agnostic (browser native) component library comprising UI components, including widgets, that can be used to build UI paged in any technology (e.g., angular, react, and others). It is a repository that stores the code and metadata required to render each UI component available to the tenant. It includes detailed information on each component's properties, behaviors, and the ways in which they can be customized or configured. A widget may be comprised of multiple smaller (base) UI elements, such as buttons, check boxes, etc. The UI Component Registry includes all the code and metadata to render these base UI elements, allowing developers of this system to easily extend and expand the widgets available to tenant users by using existing base elements to create a new widget. The UI Component Registry is described further with respect to FIG. 4.

The No-Code UI Builder (120) provides a no-code development workspace for constructing tenant-specific UIs. It provides page templates and tools that allow for the dragging and dropping of UI components into a custom page layout. The No-Code UI Builder obtains component metadata from the UI Component registry to display the UI component choices to the tenant user. It also obtains a tenant's data schema model from the Data Schema Module. It uses the tenant's data schema model metadata to enable a tenant user to view, select, and associate specific data fields with the UI components. The No-Code UI Builder saves a page layout definition for each custom UI page created. The page layout definition describes the sections, the UI components, and the associated data objects and fields in the page.

The Page Renderer (150) renders custom UI pages using the page layout definitions. To render a page, the Page Render (150) reads the page layout definition for the page to identify the UI component(s) in a page and the associated data fields. It retrieves the code necessary to render the UI components from the UI Component Registry. It retrieves the data from the associated data fields from the Multi-Tenant Cloud Datastore (160) and performs substantially real-time data binding between the UI components and the retrieved data. It interjects the components and bound data into the rendered page.

The Multi-Tenant Cloud Datastore (160) stores tenant data for a SaaS application. For each tenant, the Datastores stores the tenant's data objects (176) (i.e., the tenant's data in the applicable SaaS application), the tenant's data schema model metadata (174), and the page layout definitions (172) for the pages in the tenant's UI for the SaaS application. In one embodiment, the Multi-Tenant Cloud Datastore (160) is the blob-based data storage and retrieval system described in U.S. patent Ser. No. 11/720,563, issued on Aug. 8, 2023, and titled "Data Storage and Retrieval System for a Cloud-Based Multi-Tenant Application," the content of which are incorporated herein by reference.

In one embodiment, when a tenant user creates a custom UI page, the No-Code UI Builder automatically selects a Data Provider and an Action Provider.

A 'Data Provider' connects a page with its data object source which can be a single object or multiple objects. The default data provider can be further extended to a custom data provider if a tenant user choses to change the behavior of the default data provider.

An 'Action Provider' defines the actions that can be added to a page. The action names and action handlers are defined by Action Provider, which are included by default. Tenant users can map default actions like click, drag/drop, selection, CRUD actions that comes out of the box by default. Customer/Tenant user can add new actions and behavior to the library of actions that will extend the default action provider further.

3. Method for Enabling No-Code UI Development with Extensible Data Schema Model Support FIG. 2 illustrates a method for enabling a tenant user to create custom UI pages for a multi-tenant, cloud-based application without coding, where the user is able to add custom data fields to UI components in the UI pages. The system provides an extensible data schema framework that allow each tenant in the multi-tenant environment to define and customize their own data schema model (210). In response to receiving tenant-specific data schema model input (215), the system stores the tenant's data schema model metadata in the multi-tenant cloud datastore (160).

The No-Code UI Builder (120) provides a no-code development workspace (250) in which a tenant user can construct tenant-specific UIs for the application. In one embodiment, a tenant user may create a new UI page by selecting a page template (265) in the workspace or modify an existing UI page by opening up the UI page in the workspace.

In providing the workspace, the No-Code UI Builder obtains UI components metadata from the UI Component Registry (140) and displays a list of available UI components in a UI Component Library (267). In one embodiment, a tenant user is able drag and drop UI components from the library onto a page (272) within the workspace. A page may be divided into one or more sections, and the tenant user may add sections and then add UI components to specific sections. The workspace can hold multiple pages at once.

The No-Code UI builder also obtains the tenant's data schema model metadata from the Multi-Tenant Cloud Datastore (160) and uses the metadata to display a list of tenant-specific data objects and associated data fields (270) in the workspace. The No-Code UI Builder enables the user to select one or more data fields in the tenant's data schema model and associate the selected data field(s) with a UI component on a page within the workspace. More specifically, in one embodiment, the user first selects a UI component from a library of UI components (267), adds the UI component to the page (272) (e.g., by dragging and dropping), selects a data object, selects one or more data fields of the data object (where the displayed data objects and data fields are specified by the tenant's data schema model metadata) (270), and associates the selected data object and data fields with a UI component. When a tenant user updates the tenant's data schema model, the data objects and data fields displayed in the workspace are automatically updated accordingly.

When a tenant user saves a custom UI page, the No-Code Builder generates a page layout definition for the page (245). The page layout definition (245) describes the sections, UI components, and the associated data objects and fields in the page. It can be thought of as page metadata that represents everything that will be visible on the rendered page. This metadata-driven approaches allows tenant users to create, change, and update UI pages without coding. Changes to UI pages can be achieved by the tenant user simply dragging and dropping UI components onto the pages and/or associating new data fields with an existing UI component. The No-Code UI Builder will then automatically update the page layout definition to reflect the tenant user's changes. For example, if a tenant user adds a custom data field to a UI component on a UI page, the No-Code UI Builder automatically updates the page layout definition to associate the custom data field with the UI component. No coding is required by the tenant user. As described below, the Layout Renderer is able to parse the page layout definition, use the page metadata to identify the data associated with each UI component on the page, inject the applicable data into the UI component, and use UI rules (described below) within the page layout definition to render the UI component correctly.

In one embodiment, the page layout definition is a structured data file in JSON format. The page layout definition is saved in the Multi-Tenant Cloud Datastore (160). A tenant user may create multiple UI pages that form a custom UI application for the tenant.

In one embodiment, a page layout definition conforms to the following rules and syntax:

1. Every page layout has a unique name, type, version and other metadata.
2. Every page layout has a main section of type 'section' at the root level.
3. Every 'section' may have one or more sections nested within it.
4. Every section has a layout direction which will determine how the items inside the section will be laid out. In one embodiment, the layout direction can be 'row' or 'column', where the default is 'column'.
5. Every section may define the number of columns supported in the section.
6. Every section may have one or more components nested within it.
7. A section can have either 'sections' or 'components' nested within it, not both.
8. UI Rules can be added to the whole layout at the page global level or at every component level.
   1. Each UI component supports UI rules which specify conditions that will trigger an action in rendering the component on the page. UI Rules are a way to build complex form validation logic, conditional showing and hiding of actions or components, and defining dynamic display logic based on data state and user input. In one embodiment, a UI rule specifies one or more conditions under which a first set of actions that will execute. It also specifies a second set of actions that will execute if the condition(s) are not satisfied.
9. Every UI component has a 'type' property whose value is string that can be resolved from UI Component Registry.

10. One semantic block of JSON under the 'components' identifies one whole component and its associated metadata.
    a. The structure of a UI Component block is defined by the component authors through component model and manifest (see discussion of FIG. 4 below).
    a. Component authors can control the editable properties of a component using the component's manifest.
11. There can be any level of section nesting. Sections can be marked with 'span' property to determine the relative width and height corresponding to the parent.
12. There can be any number of components inside a section.
13. Each component and section have an id which is unique to the layout.
14. Section and components can be applied with custom styles via 'customStyleClass' and 'customStyles'.
15. Each component has a unique ID, and components can communicate between themselves using the unique component IDs.

An example of a page layout definition that conforms to the above-listed rules and syntax is set forth in Section 7 below.

4. Rendering Custom UI Pages

Figure 3:
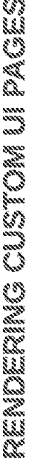
FIG. 3 is a flow diagram that illustrates the dynamic process of rendering custom UI pages.

FIG. 3 illustrates the dynamic process of rendering custom UI pages, which is executed by the Layout Renderer module (150). The Layout Renderer is tasked with bringing the custom UI pages to life by translating the corresponding page layout definitions into a fully functional UI.

To render a UI Page, the Layout Render obtain the page layout definition (245) for the page from the Multi-Tenant Cloud Storage (160). The Layout Render reads the page layout definition to identify the sections and UI components within the UI page, as well as the data sources for the UI components. A UI page may be divided into one or more sections, and the Section Renderer (365) within the Layout Renderer constructs the skeletal structure of the sections in accordance with the page layout definition.

Concurrently, the Component Injector (375) retrieves the necessary code and metadata for each UI component specified by the page layout definition from the UI Component Registry (140). For each of these UI components, the Component Injector performs real-time data binding by integrating data (355) from the applicable data field(s) with the corresponding UI components. The data for this binding is sourced directly from the tenant's specific data within the Multi-Tenant Cloud Datastore (or associated cache) (160). The data objects and data fields from which data are retrieved are the data object/fields associated with UI component during the UI page creation process, as described with respect to FIG. 2.

The culmination of this process results in an Extensible Page (385) composed of various UI components organized into one or more sections. This page is then served to a tenant client computer (390), providing a tenant-specific UI that is interactive, responsive, and tailored to the tenant's unique data and functional requirements.

The page is extensible in that an administrator at a tenant may further modify the page in accordance with the process described with respect to FIG. 2. For example, the administrator may open up the page in the workspace provided by the No-Code UI Builder and insert additional UI components on the page or associated additional data fields with a UI component.

The way in which the Layout Render renders UI pages is faster and more efficient than conventional page rendering techniques. In conventional page rendering, data is bidirectional—every change in data is synced in UI and every change in UI is synced in data. This makes the page rendering very slow. Some frameworks have improved the page rendering using heavy abstraction on top of DOM. Such techniques do not scale well and restrict the runtime configurability of the pages.

The system described with respect to FIGS. 1-4 relies only on unidirectional data to render a page in that data flows from the datastore to the UI. If data in the datastore is updated, the UI is updated accordingly as a result of the real-time binding performed by the Layout Renderer. The UI does not keep state. The UI is generated from JSON metadata in the page layout definition with data binding happening in substantially real time.

5. UI Component Library

Figure 4:
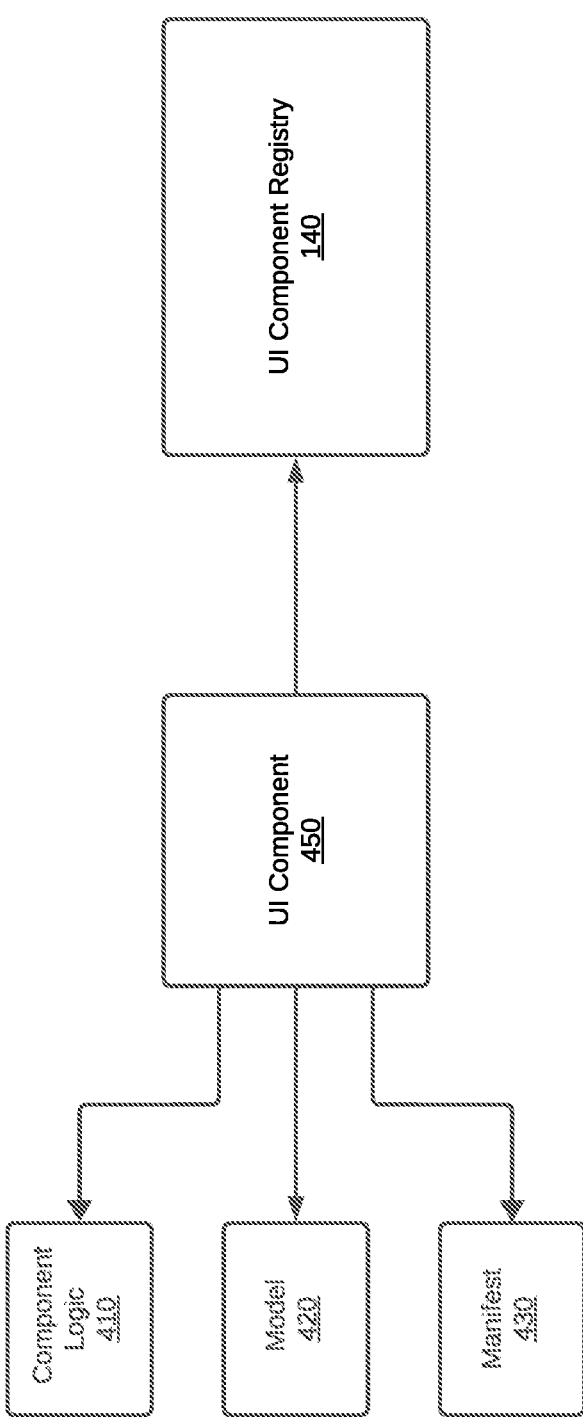
FIG. 4 is a block diagram that illustrates the UI component data stored by the Component Registry.

FIG. 4 illustrates the component data stored by the Component Registry (140). For each UI Component (450) in the Component Registry, the Registry includes the following:
    Component Logic (410): This is the business logic of the component. In one embodiment, this includes a components html template and CSS styles.
    Model (420): The model is a class defining the component layout. In one embodiment, this is in JSON format.
    Manifest (430): This is metadata about the component, its properties, and its events. In one embodiment, this is in JSON format.

6. General

The methods described with respect to FIGS. 1-4 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

In certain embodiment, the multi-tenant, cloud-based application is a Quote-to-Cash application that operates in a cloud, such as AMAZON AWS or MICROSOFT AZURE. "Quote-to-Cash" is the sales lifecycle of a customer, which starts with a creating a quote and ends with revenue generation. A Quote-to-Cash application provides functionality that enables a user to create and manage data, including documents, in the Quote-to-Cash lifecycle.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

7. Example Page Layout Definition

A page may have many UI components, each of which is identified by an 'id' and 'type' in the page layout definition. Each UI component supports UI rules that specify conditions to watch for and actions to take when the conditions are satisfied. UI Rules are a way to build complex form validation logic, enable conditional showing and hiding of actions or components, and defining dynamic display logic based on data state and user input. UI rules can be added to the whole layout at the page global level or at every UI component level. Below is a sample structure and syntax of the rules defined for a form UI component:

```
{
    version: '1.0.0', // Layout version
    type: 'edit-page', // Page type
    customStyleClass: '', // Custom type class if required
    uiRules : [ ] // Page level rules if any
    section: { // Main section of the page
        layout: 'column', // Component stacking direction
        sections: [ // Nested sections in the page
            {
                width: '100%', // Width of this section
                layout: 'row', // Component stacking direction of this section
                components: [ // Components in this section
                    {
                        type: 'form', // Component type to render, this is
part of component stsyem
                        uiRules: [ // This block is used to define the array
of rules to be attached on a component. Here below rules are defined on the form
component
                            {
                                componentId: 'object-name-details-field', //Id
of the component the rule will be applied to.
                                componentProperty: 'value', // THe
component property name that is controlled by the rule
                                seriesId ?: string; //If rule is a
DependentCondition, this will be the Id used to check all other rules in the series.
                                dependentSeriesId: 'is-category-disabled',
//This will indicate this rule is used to evaluate a DependentCondition rule. This must
match a seriesId.
                                validation: { //The validation to execute to
determine which actions to take.
                                    /* a validation config can be
of below structure
                                        ValidationConfig = {
condition: string; //The function to run to determine if valid or invalid. List of available
functions are at the bottom of this document.
logicalOperator ?: string; //If using a function that compares a value, specify the operator
here.
comparison Value ?: string; //The value to compare against.
validationFunc ?: string; //A string version of a function that will be used in
CustomCondition for custom validation. Stringify with the built in .toString() of functions.
                                        }
                                    */
                                    condition: 'ValueRequiredCondition',
                                },
                                validActions: [ //If validation is met, execute
valid actions.
                                    /*
                                        actions can be of below
structure
                                        type ActionConfig = {
                                            property ?:
string; //Property to update on a component specified in dependentComponentId here, or
componentId at the top level of the rule.
                                            value ?:
string; //Value to update the property to.
dependentComponentId ?: string; //If specified, updates the property on this component
instead of the one specified by componentId.
                                            ruleFunc ?:
string //A string version of a function to do more customization with changing public
properties of a component. Stringify with the built in .toString() of functions.
                                        }
                                    */
                                    {
                                        dependentComponentId: 'object-
display-name-details-field',
                                        property: 'disabled',
                                        value: false,
                                    },
                                ],
                                invalidActions: [ //If validation is not met,
execute invalid actions.
                                    {
                                        dependentComponentId: 'object-
display-name-details-field',
                                        property: 'disabled',
                                        value: true,
                                    },
                                ],
```

```
          },
          {
              componentId: 'signer-type-select',
              componentProperty: 'value',
              dependentSeriesId:
'dependentPicklistDisabled',
              validation: {
                  condition: 'ValueRequiredCondition',
              },
              validActions: [ ],
              invalidActions: [ ],
          },
          {
              componentId: 'signer-type-select',
              componentProperty: 'value',
              validation: {
                  condition: 'CustomCondition',
                  validationFunc: function (payload:
RulesFunctionPayload) {
                      return
payload.element.value.includes('CarbonCopy');
                  } .toString( ),
              },
              validActions: [
                  {
                      property: 'items',
                      dependentComponentId: 'dependent-
picklist-select',
                      value: carbonCopyItems,
                  },
              ],
              invalidActions: [
                  {
                      property: 'items',
                      dependentComponentId: 'dependent-
picklist-select',
                      value: allItems,
                  },
              ],
          },
          {
              componentId: 'object-description-details-
field',
              componentProperty: 'value',
              dependentSeriesId: 'is-category-disabled',
              validation: {
                  condition: 'ValueLengthCondition',
                  logicalOperator: '>=',
                  comparison Value: 10,
              },
              validActions: [ ]
                  {
                      property: 'errorText',
                      value: '',
                  },
              ],
              invalidActions: ]
                  {
                      property: 'errorText',
                      value: 'Object description must be 10
characters or more',
                  },
              ],
          },
          {
              componentId: 'zip-code-details-field',
              seriesId: 'is-category-disabled',
              validation: {
                  condition: 'DependentCondition',
              },
              validActions: ]
                  {
                      property: 'disabled',
                      value: false,
                  },
              ],
              invalidActions: [
                  {
                      property: 'disabled',
```

```
            value: true,
        },
    ],
},
{
    componentId: 'dependent-picklist-select',
    seriesId: 'dependentPicklistDisabled',
    validation: {
        condition: 'DependentCondition',
    },
    validActions: [
        {
            property: 'disabled',
            value: false,
        },
    ],
    invalidActions: [
        {
            property: 'disabled',
            value: true,
        },
    ],
},
{
    componentId: 'zip-code-details-field',
    componentProperty: 'value',
    validation: {
        condition:
'ValueMatchesPatternCondition',
        comparison Value: '\\d{5}(-\\d{4})?',
    },
    validActions:[
        {
            property: 'errorText',
            value: '',
        },
    ],
    invalidActions: [
        {
            property: 'errorText',
            value: 'Value must be in format of:
xxxxx-xxxx (where "x" is a number)',
        },
    ],
},
{
    componentId: 'is-shared-details-field',
    componentProperty: 'checked',
    validation: {
        condition: 'BooleanCondition',
    },
    validActions: [
        {
            property: 'disabled',
            dependentComponentId: 'boolean-
controlled-details-field',
            value: false,
        },
    ],
    invalidActions: [
        {
            property: 'disabled',
            dependentComponentId: 'boolean-
controlled-details-field',
            value: true,
        },
    ],
},
],
section: {
    type: 'section',
    label: 'Edit Object',
    rowHeight: 'auto',
    layout: 'column',
    customStyleClass: null,
    sections: [
        {
            layout: 'row',
            columns: 2,
```

```
components: [
    {
        type: 'detailsField',
        label: 'Signer Type',
        fieldId: 'SignerType',
        required: true,
        is Visible: false,
        customFieldFilter: null,
        customStyleClass: null,
        multiple WithChips: true,
        isEditable: true,
        id: 'signer-type-select',
    },
    {
        type: 'detailsField',
        label: 'Dependent Picklist',
        fieldId: 'DependentPicklist',
        helpText:
            'Signer Type select must have a
value to make this field not disabled. All seven items will be visible when Signer Type
does not contain CarbonCopy. When Signer Type does contain CarbonCopy, only items 5
and 6 will be visible.',
        required: true,
        is Visible: false,
        customFieldFilter: null,
        customStyleClass: null,
        isEditable: true,
        id: 'dependent-picklist-select',
    },
    {
        type: 'detailsField',
        label: 'Object Name',
        fieldId: 'Name',
        helpText:
            'Object Name and Object
Description must be filled out to make Object Category not disabled.',
        required: true,
        is Visible: false,
        customFieldFilter: null,
        customStyleClass: null,
        isEditable: true,
        id: 'object-name-details-field',
    },
    {
        label: 'Object Description',
        type: 'detailsField',
        fieldId: 'Description',
        id: 'object-description-details-field',
        helpText:
            'The character length of the value
in this field must be greater than or equal to 10.',
    },
    {
        label: 'Object Display Name',
        type: 'detailsField',
        fieldId: 'DisplayName',
        id:   'object-display-name-details-
field',
        helpText: 'Object Name must have a
value or this field is disabled.',
    },
    {
        label: 'Zip Code',
``` type: 'detailsField', fieldId: 'ZipCode', required: true, id: 'zip-code-details-field', helpText: 'This field is dependent on Object Name and Object Description rules (Object Name must have a value and Object Description value must have a length>=10).

Then the value of this field must match the regex pattern: \d{5}(-\d{4})?—this is a zipcode format of xxxxx-xxxx where "x" is a number.',

```
    },
    {
        label: 'Is Shared ',
        type: 'detailsField',
        fieldId: 'IsShared',
        id: 'is-shared-details-field',
        toggle: true,
        description: 'This is the is shared
```
field.',
```
    },
    {
        label: 'Boolean Controlled Field',
```

-continued

```
            type: 'detailsField',
            fieldId: 'BooleanControlledField',
            id: 'boolean-controlled-details-field',
            helpText: 'This field is disabled
    unless Is Shared is toggled on.',
            },
        ],
            sections: [ ],
        },
    ],
        components: [ ],
        id: 'edit-object-section',
    },
    sections: [ ],
    components: [ ],
    inlineEdit: false,
    id: 'edit-object-form',
    };
    ]
    }
    ]
    }
}
```

The invention claimed is:

1. A method for enabling no-code creation of a tenant-specific UI for a multi-tenant, cloud-based application, the method comprising:

enabling an extensible data schema framework in which each tenant is able to create tenant-specific fields for data objects that are unique to each tenant's application's requirements within the multi-tenant, cloud-based application;

receiving tenant-specific data schema model inputs from a tenant and updating the tenant's data schema model in a multi-tenant cloud-based datastore;

maintaining a UI component registry, wherein the UI component registry stores all code and metadata required to render each UI component in the registry; and providing a no-code UI development workspace for constructing tenant-specific UIs for the multi-tenant, cloud-based application, enabling a tenant user to:

create custom pages for the multi-tenant, cloud-based application;

add UI components to the custom pages from the UI component registry without coding;

select and associate, without coding, tenant-specific data fields with the added UI components using metadata obtained from the tenant's data schema model in the multi-tenant datastore;

for each custom page created by the tenant, saving a page layout definition describing the page layout configuration, the UI component(s) on the page, and the tenant-specific data object and associated data fields associated with each UI component;

rendering a tenant-specific UI interface for the multi-tenant, cloud-based application comprising one or more custom pages, wherein each custom page is rendered in substantially real time in accordance with the page layout definition for the page and rendering the page includes:

retrieving code and metadata for each UI component referenced in the page layout definition, wherein the code and metadata is retrieved from the UI component registry;

performing substantially real-time data binding between the UI components in the page layout definition and the corresponding tenant-specific data fields selected by the tenant, wherein the bound data is retrieved from the tenant's data in the multi-tenant data store; and injecting the components and bound data into the rendered page.

2. The method of claim 1, wherein the UI components include UI widgets.

3. The method of claim 1, wherein performing the substantially real-time data binding including binding data from a custom data field created by the tenant.

4. The method of claim 1, wherein a tenant is able to select from a plurality of page templates in creating a custom page.

5. The method of claim 1, further comprising enabling the rendered page to be further edited in the no-code UI development workspace.

6. The method of claim 1, wherein the page layout definition for a UI page further describes:

one or more sections on the page, wherein the UI components on the page are nested within one or more sections;

a layout direction for each section;

one or more UI rules that specify a first set of UI-related actions will be executed for one or more of the components in response to a set of conditions being satisfied and a second set of UI-related actions that will be executed in response to the set of conditions not being satisfied; and a 'type' property for each UI component, the value of which enables the code and metadata required to render the UI component to be obtained from the UI component registry.

7. The method of claim 1, wherein the page layout definition conforms to the following rules and syntax:

every page layout has a unique name, type, and version;

every page layout has one or more sections;

every page layout has a main section of type 'section' at the root level;

every section may have one or more sections nested within it;

every section has a layout direction which will determine how the items inside the section will be laid out;

every section defines the number of columns supported in the section;

every section may have one or more components nested within it;

a section can have either 'sections' or 'components' nested within it, not both;

every page layout includes UI rules which can be applied globally at the page level or individually at the UI component level, wherein a UI rule which specifies one or more conditions that will trigger an action in rendering one or more components on the page;

every UI component has a 'type' property whose value is string that can be resolved from the UI component registry;

one semantic block of JSON under the 'components' identifies one whole component and its associated metadata;

there can be any level of section nesting;

there can be any number of components inside a section;

each component and section have a unique id which is unique to the layout, where UI components can communicate between themselves using their unique IDs; and section and components can be applied with custom styles.

8. A system for enabling no-code creation of a tenant-specific UI for a multi-tenant, cloud-based application, the system comprising:

one or more processors;

one or more memory units coupled to the one or more processors, wherein the one or more memory units store instructions that, when executed by the one or more processors, cause the system to perform the operations of:

enabling an extensible data schema framework in which each tenant is able to create tenant-specific fields for data objects that are unique to each tenant's application's requirements within the multi-tenant, cloud-based application;

receiving tenant-specific data schema model inputs from a tenant and updating the tenant's data schema model in a multi-tenant cloud-based datastore;

maintaining a UI component registry, wherein the UI component registry stores all code and metadata required to render each UI component in the registry; and providing a no-code UI development workspace for constructing tenant-specific UIs for the multi-tenant, cloud-based application, enabling a tenant user to:

create custom pages for the multi-tenant, cloud-based application:

add UI components to the custom pages from the UI component registry without coding;

select and associate, without coding, tenant-specific data fields with the added UI components using metadata obtained from the tenant's data schema model in the multi-tenant datastore;

for each custom page created by the tenant, saving a page layout definition describing the page layout configuration, the UI component(s) on the page, and the tenant-specific data object and associated data fields associated with each UI component;

rendering a tenant-specific UI interface for the multi-tenant, cloud-based application comprising one or more custom pages, wherein each custom page is rendered in substantially real time in accordance with the page layout definition for the page and rendering the page includes:

retrieving code and metadata for each UI component referenced in the page layout definition, wherein the code and metadata is retrieved from the UI component registry;

performing substantially real-time data binding between the UI components in the page layout definition and the corresponding tenant-specific data fields selected by the tenant, wherein the bound data is retrieved from the tenant's data in the multi-tenant datastore; and injecting the components and bound data into the rendered page.

9. The system of claim 8, wherein the UI components include UI widgets.

10. The system of claim 8, wherein performing the substantially real-time data binding including binding data from a custom data field created by the tenant.

11. The system of claim 8, wherein a tenant is able to select from a plurality of page templates in creating a custom page.

12. The system of claim 8, further comprising enabling the rendered page to be further edited in the no-code UI development workspace.

13. The system of claim 8, wherein the page layout definition for a UI page further describes:

one or more sections on the page, wherein the UI components on the page are nested within one or more sections;

a layout direction for each section;

one or more UI rules that specify a first set of UI-related actions will be executed for one or more of the components in response to a set of conditions being satisfied and a second set of UI-related actions that will be executed in response to the set of conditions not being satisfied; and a 'type' property for each UI component, the value of which enables the code and metadata required to render the UI component to be obtained from the UI component registry.

14. A non-transitory computer-readable medium comprising a computer program, that, when executed by a computer system, enables the computer system to perform the following method for enabling no-code creation of a tenant-specific UI for a multi-tenant, cloud-based application, wherein the method comprises:

enabling an extensible data schema framework in which each tenant is able to create tenant-specific fields for data objects that are unique to each tenant's application's requirements within the multi-tenant, cloud-based application;

receiving tenant-specific data schema model inputs from a tenant and updating the tenant's data schema model in a multi-tenant cloud-based datastore;

maintaining a UI component registry, wherein the UI component registry stores all code and metadata required to render each UI component in the registry; and providing a no-code UI development workspace for constructing tenant-specific UIs for the multi-tenant, cloud-based application, enabling a tenant user to:

create custom pages for the multi-tenant, cloud-based application;

add UI components to the custom pages from the UI component registry without coding;

select and associate, without coding, tenant-specific data fields with the added UI components using metadata obtained from the tenant's data schema model in the multi-tenant datastore;

for each custom page created by the tenant, saving a page layout definition describing the page layout configuration, the UI component(s) on the page, and the tenant-specific data object and associated data fields associated with each UI component;

rendering a tenant-specific UI interface for the multi-tenant, cloud-based application comprising one or more custom pages, wherein each custom page is rendered in substantially real time in accordance with the page layout definition for the page and rendering the page includes:

retrieving code and metadata for each UI component referenced in the page layout definition, wherein the code and metadata is retrieved from the UI component registry;

performing substantially real-time data binding between the UI components in the page layout definition and the corresponding tenant-specific data fields selected by the tenant, wherein the bound data is retrieved from the tenant's data in the multi-tenant data store; and injecting the components and bound data into the rendered page.

15. The non-transitory computer-readable medium of claim 14, wherein the UI components include UI widgets.

16. The non-transitory computer-readable medium of claim 14, wherein performing the substantially real-time data binding including binding data from a custom data field created by the tenant.

17. The non-transitory computer-readable medium of claim 14, wherein a tenant is able to select from a plurality of page templates in creating a custom page.

18. The non-transitory computer-readable medium of claim 14, further comprising enabling the rendered page to be further edited in the no-code UI development workspace.

19. The non-transitory computer-readable medium of claim 14, wherein the page layout definition for a UI page further describes:

one or more sections on the page, wherein the UI components on the page are nested within one or more sections;

a layout direction for each section;

one or more UI rules that specify a first set of UI-related actions will be executed for one or more of the components in response to a set of conditions being satisfied and a second set of UI-related actions that will be executed in response to the set of conditions not being satisfied; and a 'type' property for each UI component, the value of which enables the code and metadata required to render the UI component to be obtained from the UI component registry.

20. The non-transitory computer-readable medium of claim 14, wherein the page layout definition conforms to the following rules and syntax:

every page layout has a unique name, type, and version;

every page layout has one or more sections;

every page layout has a main section of type 'section' at the root level;

every section may have one or more sections nested within it;

every section has a layout direction which will determine how the items inside the section will be laid out;

every section defines the number of columns supported in the section;

every section may have one or more components nested within it;

a section can have either 'sections' or 'components' nested within it, not both;

every page layout includes UI rules which can be applied globally at the page level or individually at the UI component level, wherein a UI rule which specifies one or more conditions that will trigger an action in rendering one or more components on the page;

every UI component has a 'type' property whose value is string that can be resolved from the UI component registry;

one semantic block of JSON under the 'components' identifies one whole component and its associated metadata;

there can be any level of section nesting;

there can be any number of components inside a section;

each component and section have a unique id which is unique to the layout, where UI components can communicate between themselves using their unique IDs; and section and components can be applied with custom styles.

* * * * *